US010110833B2

United States Patent
Teich et al.

(10) Patent No.: US 10,110,833 B2
(45) Date of Patent: Oct. 23, 2018

(54) HYBRID INFRARED SENSOR ARRAY HAVING HETEROGENEOUS INFRARED SENSORS

(71) Applicant: FLIR Systems, Inc., Wilsonville, OR (US)

(72) Inventors: Andrew C. Teich, West Linn, OR (US); William A. Terre, Santa Barbara, CA (US); Pierre Boulanger, Goleta, CA (US); Jeffrey D. Frank, Santa Barbara, CA (US); John H. Distelzweig, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 15/645,988

(22) Filed: Jul. 10, 2017

(65) Prior Publication Data

US 2017/0374298 A1 Dec. 28, 2017

Related U.S. Application Data

(63) Continuation of application No. 14/091,266, filed on Nov. 26, 2013, now Pat. No. 9,706,138, and a
(Continued)

(51) Int. Cl.
*H04N 5/33* (2006.01)
*H04N 5/369* (2011.01)
(Continued)

(52) U.S. Cl.
CPC ............... *H04N 5/33* (2013.01); *G01J 5/025* (2013.01); *G01J 5/026* (2013.01); *G01J 5/04* (2013.01);
(Continued)

(58) Field of Classification Search
None
See application file for complete search history.

(56) References Cited

U.S. PATENT DOCUMENTS

| 4,661,986 A | 4/1987 | Adelson |
| 5,140,416 A | 8/1992 | Tinkler |

(Continued)

FOREIGN PATENT DOCUMENTS

| CN | 101226635 | 7/2008 |
| CN | 101404084 | 4/2009 |

(Continued)

OTHER PUBLICATIONS

Ager, Thomas P., et al., "Geo-positional Accuracy Evaluation of QuickBird Ortho-Ready Standard 2A Multispectral Imagery," Algorithms and Technologies for Multispectral, Hyperspectral, and Ultraspectral Imagery X, vol. 5425, Aug. 12, 2004, pp. 488-499.
(Continued)

*Primary Examiner* — Edwin Gunberg
(74) *Attorney, Agent, or Firm* — Haynes and Boone, LLP

(57) ABSTRACT

Various techniques are provided for an infrared sensor assembly having a hybrid infrared sensor array. In one example, such a hybrid infrared sensor array may include a plurality of microbolometers and a non-bolometric infrared sensor. The non-bolometric infrared sensor may be a thermopile or other type of infrared sensor different from a bolometer-based sensor. The non-bolometric infrared sensor may be utilized to provide a more accurate and stable temperature reading of an object or area of a scene captured by the array. In some embodiments, the non-bolometric infrared sensor may also be utilized to perform a shutter-less radiometric calibration of the microbolometers of the array. An infrared sensor assembly may include, for example, the hybrid infrared sensor array, as well as a substrate including
(Continued)

bond pads and/or appropriate circuits to obtain and/or transmit output signals from the non-bolometric infrared sensor.

20 Claims, 12 Drawing Sheets

Related U.S. Application Data continuation-in-part of application No. 13/437,645, filed on Apr. 2, 2012, now Pat. No. 9,171,361, which is a continuation-in-part of application No. 13/105,765, filed on May 11, 2011, now Pat. No. 8,565,547, and a continuation-in-part of application No. 12/766,739, filed on Apr. 23, 2010, now Pat. No. 8,520,970, said application No. 13/105,765 is a continuation of application No. PCT/EP2011/056432, filed on Apr. 21, 2011, and a continuation-in-part of application No. 12/766,739, filed on Apr. 23, 2010, now Pat. No. 8,520,970, said application No. 14/091,266 is a continuation of application No. PCT/US2012/041744, filed on Jun. 8, 2012, said application No. 14/091,266 is a continuation of application No. PCT/US2012/041749, filed on Jun. 8, 2012, said application No. 14/091,266 is a continuation of application No. PCT/US2012/041739, filed on Jun. 8, 2012, and a continuation-in-part of application No. 12/766,739, filed on Apr. 23, 2010, now Pat. No. 8,520,970.

(60) Provisional application No. 61/790,189, filed on Mar. 15, 2013, provisional application No. 61/730,031, filed on Nov. 26, 2012, provisional application No. 61/748,018, filed on Dec. 31, 2012, provisional application No. 61/473,207, filed on Apr. 8, 2011, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011.

(51) Int. Cl.
    *G01J 5/02*    (2006.01)
    *G01J 5/04*    (2006.01)
    *G01J 5/12*    (2006.01)
    *G01J 5/20*    (2006.01)
    *G01J 5/08*    (2006.01)
    G01J 5/00     (2006.01)

(52) U.S. Cl.
    CPC .............. *G01J 5/0846* (2013.01); *G01J 5/12* (2013.01); *G01J 5/20* (2013.01); *H04N 5/3696* (2013.01); *G01J 2005/0048* (2013.01); *G01J 2005/0077* (2013.01); *Y10T 29/49117* (2015.01)

(56) References Cited

U.S. PATENT DOCUMENTS

| 5,488,674 | A | 1/1996 | Burt et al. |
| 6,297,794 | B1 | 10/2001 | Tsubouchi et al. |
| 6,330,371 | B1 | 12/2001 | Chen et al. |
| 7,616,877 | B2 | 11/2009 | Zarnowski et al. |
| 7,620,265 | B1 | 11/2009 | Wolff et al. |
| 7,629,582 | B2 * | 12/2009 | Hoffman ............... B65G 59/08 250/338.1 |
| 7,876,973 | B2 | 1/2011 | Fairbanks et al. |
| 2001/0035559 | A1 | 11/2001 | Ando et al. |
| 2002/0058352 | A1 | 5/2002 | Jacksen et al. |
| 2002/0143257 | A1 | 10/2002 | Newman et al. |
| 2003/0091090 | A1 | 5/2003 | Schieferdecker et al. |
| 2005/0157772 | A1 | 7/2005 | Fischer et al. |
| 2007/0170359 | A1 | 7/2007 | Syllaios et al. |
| 2008/0259181 | A1 | 10/2008 | Yamashita et al. |
| 2009/0303363 | A1 | 12/2009 | Blessinger |
| 2010/0020229 | A1 | 1/2010 | Hershey et al. |
| 2010/0127172 | A1 | 5/2010 | Nikoobakht |
| 2011/0248167 | A1 | 10/2011 | Gurvitch et al. |

FOREIGN PATENT DOCUMENTS

| EP | 0973137 | 1/2000 |
| EP | 1983485 | 10/2008 |
| EP | 2136554 | 12/2009 |
| GB | 2442512 | 4/2008 |
| JP | 2004004465 | 1/2004 |
| JP | 2004241491 | 8/2004 |
| JP | 2007267035 | 10/2007 |
| WO | WO 00/23814 | 4/2000 |
| WO | WO 2006/038213 | 4/2006 |
| WO | WO 2008/127297 | 10/2008 |

OTHER PUBLICATIONS

FLIR Systems, Inc., "IR Automation Guidebook: Temperature Monitoring and Control with IR Cameras", Jan. 1, 2008, pp. 1-68, FLIR Systems Incorporated, http://www.automation.com/pdfarticles/Automation Guidebook.pdf.

Gangkofner, Ute G., et al., "Optimizing the High-Pass Filter Addition Technique for Image Fusion," Photogrammetric Engineering & Remote Sensing, vol. 74, No. 9, Sep. 1, 2008, pp. 1107-1118.

Hao et al., "An Infrared Image Fusion Algorithm Based on Lifting Wavelet Transform", Laser & Infrared, Jan. 31, 2009, vol. 39, No. 1, pp. 97-100.

Yan Jixiang, "Infrared Image Sequence Enhancement Based on Wavelet Transform", Full-Text Database of China Excellent Master Degree Thesis, Information Technology Collection, Jan. 15, 2009, No. 01, pp. 1-69.

\* cited by examiner

HYBRID INFRARED SENSOR ARRAY HAVING HETEROGENEOUS INFRARED SENSORS

CROSS-REFERENCE TO RELATED APPLICATIONS

This patent application is a continuation of U.S. patent application Ser. No. 14/091,266 filed Nov. 26, 2013 and entitled "HYBRID INFRARED SENSOR ARRAY HAVING HETEROGENEOUS INFRARED SENSORS" which is hereby incorporated by reference in its entirety.

U.S. patent application Ser. No. 14/091,266 claims the benefit of U.S. Provisional Application Nos. 61/790,189 filed Mar. 15, 2013 and 61/730,031 filed Nov. 26, 2012, both of which are entitled "HYBRID INFRARED SENSOR ARRAY HAVING HETEROGENEOUS INFRARED SENSORS" and hereby incorporated by reference in their entireties.

U.S. patent application Ser. No. 14/091,266 claims the benefit of U.S. Provisional Patent Application No. 61/748,018 filed Dec. 31, 2012 and entitled "COMPACT MULTI-SPECTRUM IMAGING WITH FUSION" which is hereby incorporated by reference in its entirety.

U.S. patent application Ser. No. 14/091,266 is a continuation-in-part of U.S. patent application Ser. No. 13/437,645 filed Apr. 2, 2012 and entitled "INFRARED RESOLUTION AND CONTRAST ENHANCEMENT WITH FUSION" which is hereby incorporated by reference in its entirety.

U.S. patent application Ser. No. 13/437,645 is a continuation-in-part of U.S. patent application Ser. No. 13/105,765 filed May 11, 2011 and entitled "INFRARED RESOLUTION AND CONTRAST ENHANCEMENT WITH FUSION" which is hereby incorporated by reference in its entirety.

U.S. patent application Ser. No. 13/437,645 also claims the benefit of U.S. Provisional Patent Application No. 61/473,207 filed Apr. 8, 2011 and entitled "INFRARED RESOLUTION AND CONTRAST ENHANCEMENT WITH FUSION" which is hereby incorporated by reference in its entirety.

U.S. patent application Ser. No. 13/437,645 is also a continuation-in-part of U.S. patent application Ser. No. 12/766,739 filed Apr. 23, 2010 and entitled "INFRARED RESOLUTION AND CONTRAST ENHANCEMENT WITH FUSION" which is hereby incorporated by reference in its entirety.

U.S. patent application Ser. No. 13/105,765 is a continuation of International Patent Application No. PCT/EP2011/056432 filed Apr. 21, 2011 and entitled "INFRARED RESOLUTION AND CONTRAST ENHANCEMENT WITH FUSION" which is hereby incorporated by reference in its entirety.

U.S. patent application Ser. No. 13/105,765 is also a continuation-in-part of U.S. patent application Ser. No. 12/766,739 which is hereby incorporated by reference in its entirety.

International Patent Application No. PCT/EP2011/056432 is a continuation-in-part of U.S. patent application Ser. No. 12/766,739 which is hereby incorporated by reference in its entirety.

International Patent Application No. PCT/EP2011/056432 also claims the benefit of U.S. Provisional Patent Application No. 61/473,207 which is hereby incorporated by reference in its entirety.

U.S. patent application Ser. No. 14/091,266 is a continuation-in-part of International Patent Application No. PCT/US2012/041744 filed Jun. 8, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/656,889 filed Jun. 7, 2012 and entitled "LOW POWER AND SMALL FORM FACTOR INFRARED IMAGING" which is hereby incorporated by reference in its entirety.

International Patent Application No. PCT/US2012/041744 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041744 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041744 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041744 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

U.S. patent application Ser. No. 14/091,266 is a continuation-in-part of International Patent Application No. PCT/US2012/041749 filed Jun. 8, 2012 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/041749 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041749 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041749 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

U.S. patent application Ser. No. 14/091,266 is a continuation-in-part of International Patent Application No. PCT/US2012/041739 filed Jun. 8, 2012 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/041739 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/041739 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

TECHNICAL FIELD

One or more embodiments of the invention relate generally to infrared imaging devices and more particularly, for example, to a hybrid infrared sensor assembly of such devices having two or more heterogeneous types of infrared sensors.

BACKGROUND

Infrared sensor arrays, such as those used for portable infrared cameras or other devices, are often implemented as a focal plane array having microbolometers formed on top of a substrate. Such microbolometer arrays are becoming widespread in thermal imaging applications due to their relatively small pixel dimensions and the relative simplicity of the supporting readout integrated circuit (ROIC). However, although such microbolometer arrays may permit high-resolution thermal imaging in a small package and at a low cost, they typically cannot be relied upon to acquire an accurate temperature reading due to their sensitivity to ambient temperature changes and their relative low temperature resolution (e.g., only accurate to approximately ±2° F. in one implementation).

While other types of infrared sensors may provide a more accurate and/or stable temperature determination, those other types of infrared sensors generally require more complex structures and supporting circuits, have larger pixel dimensions, and/or otherwise are more complex and costly to implement in a sensor array for thermal imaging. For example, a thermopile infrared sensor (e.g., a sensor element formed by grouping one or more thermocouples together) may be more stable over a wider temperature range and have a better temperature resolution than a bolometer-based sensor, but typically requires a more complex readout circuit and a larger pixel size to achieve a desired sensitivity, and thus may not be suitable for implementing a compact, low-cost, yet high-resolution thermal imaging array.

SUMMARY

Various techniques are provided for an infrared sensor assembly having a hybrid infrared sensor array. In one example, such a hybrid infrared sensor array may include a plurality of microbolometers and a non-bolometric infrared sensor provided in a substantially central area of the array. The non-bolometric infrared sensor may be a thermopile or other type of infrared sensor different from a bolometer-based sensor. The non-bolometric infrared sensor may be utilized to provide a more accurate and stable temperature reading of an object or area of a scene captured by the array. In some embodiments, the non-bolometric infrared sensor may also be utilized to perform a shutter-less radiometric calibration of the microbolometers of the array. An infrared sensor assembly may include, for example, the hybrid infrared sensor array, as well as a substrate including bond pads and/or appropriate circuits to obtain and/or transmit output signals from the non-bolometric infrared sensor.

In one embodiment, an infrared sensor assembly includes an array of infrared sensors, the array comprising a plurality of microbolometers configured to image a scene, and a non-bolometric sensor configured to detect infrared radiation; and a substrate coupled to the array, the substrate comprising a readout integrated circuit (ROIC) configured to provide signals from the microbolometers corresponding to a captured infrared image of the scene, and an output circuit configured to provide signals from the non-bolometric sensor.

In another embodiment, a method includes receiving, at an array of infrared sensors, infrared radiation from a scene, wherein the array comprises a plurality of microbolometers and at least one non-bolometric sensor; providing, by a readout integrated circuit (ROIC) communicatively coupled to the microbolometers, infrared image data representative of an infrared image of the scene; and providing, by an output circuit communicatively coupled to the at least one non-bolometric sensor, temperature information associated with the scene, wherein the ROIC and the output circuit are provided on a substrate.

In yet another embodiment, a method of providing a hybrid infrared sensor assembly includes fabricating microbolometers to form a focal plane array (FPA), the FPA having at least one portion without microbolometers; fabricating at least one non-bolometric sensor on the at least one portion of the FPA; providing a readout integrated circuit (ROIC) electrically coupled to the microbolometers to generate output signals corresponding to an image of infrared radiation incident on the microbolometers; and providing bond pads electrically connected to the at least one non-bolometric sensor and configured to form electrical connection with an external device to transmit signals from the at least one non-bolometric sensor.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
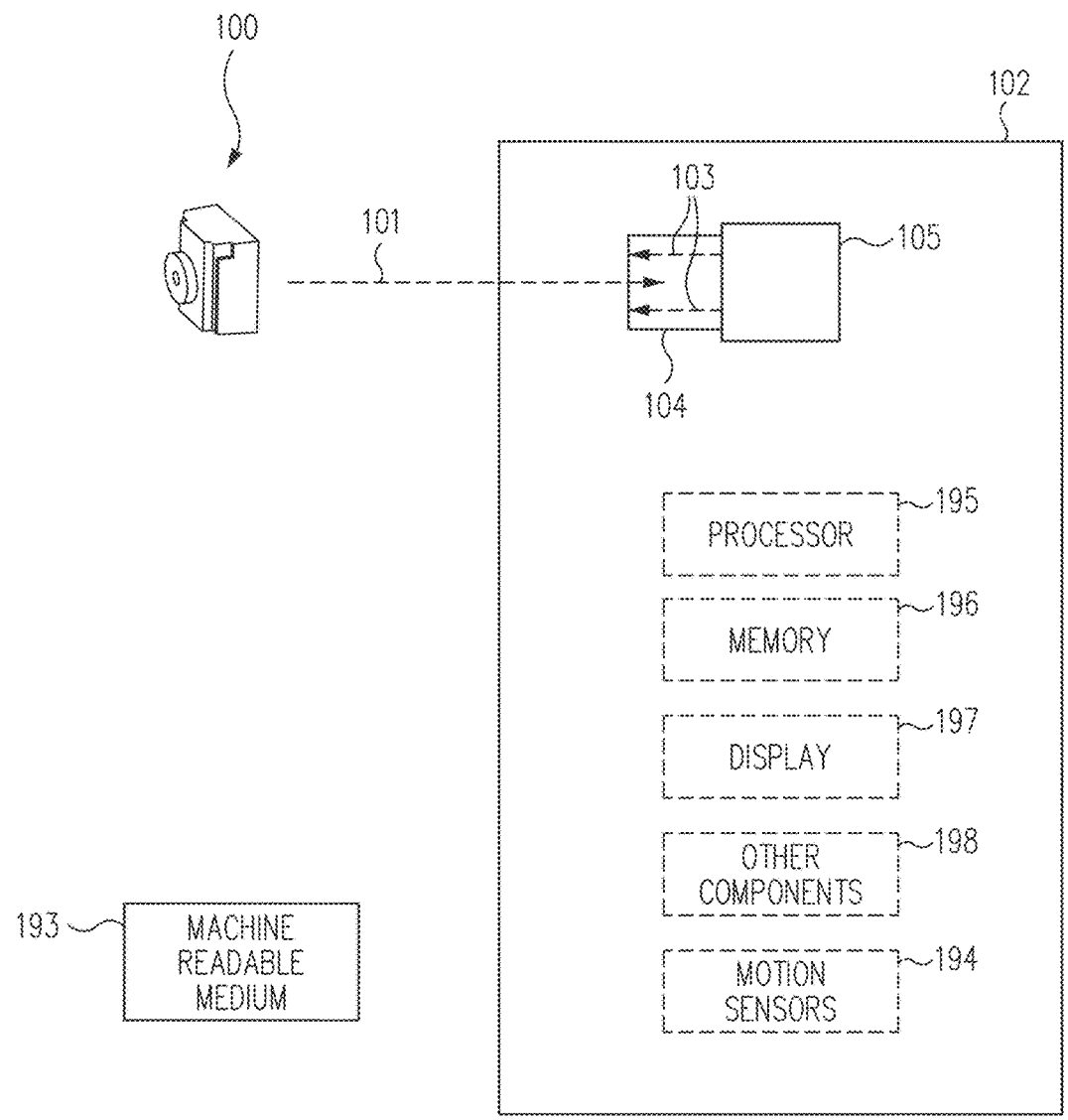
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate mobile device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
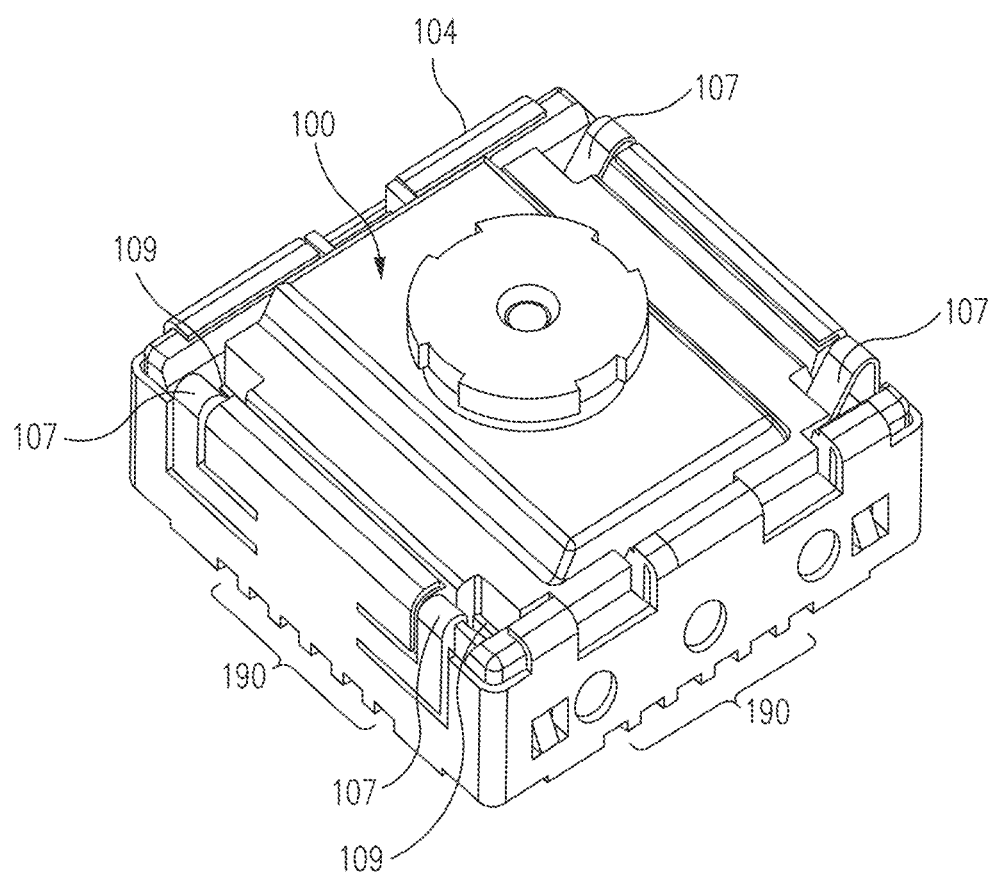
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
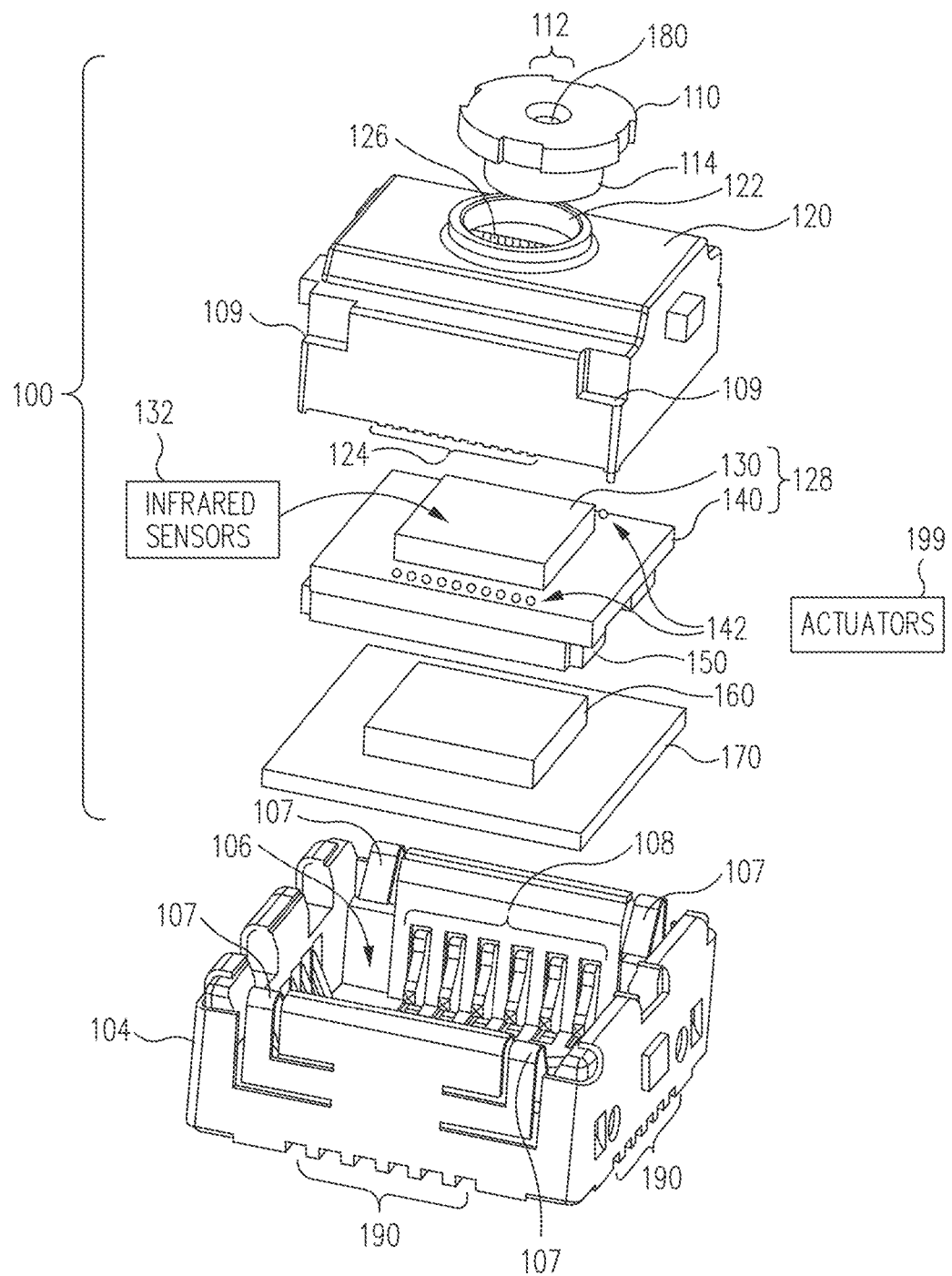
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIG. 3. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
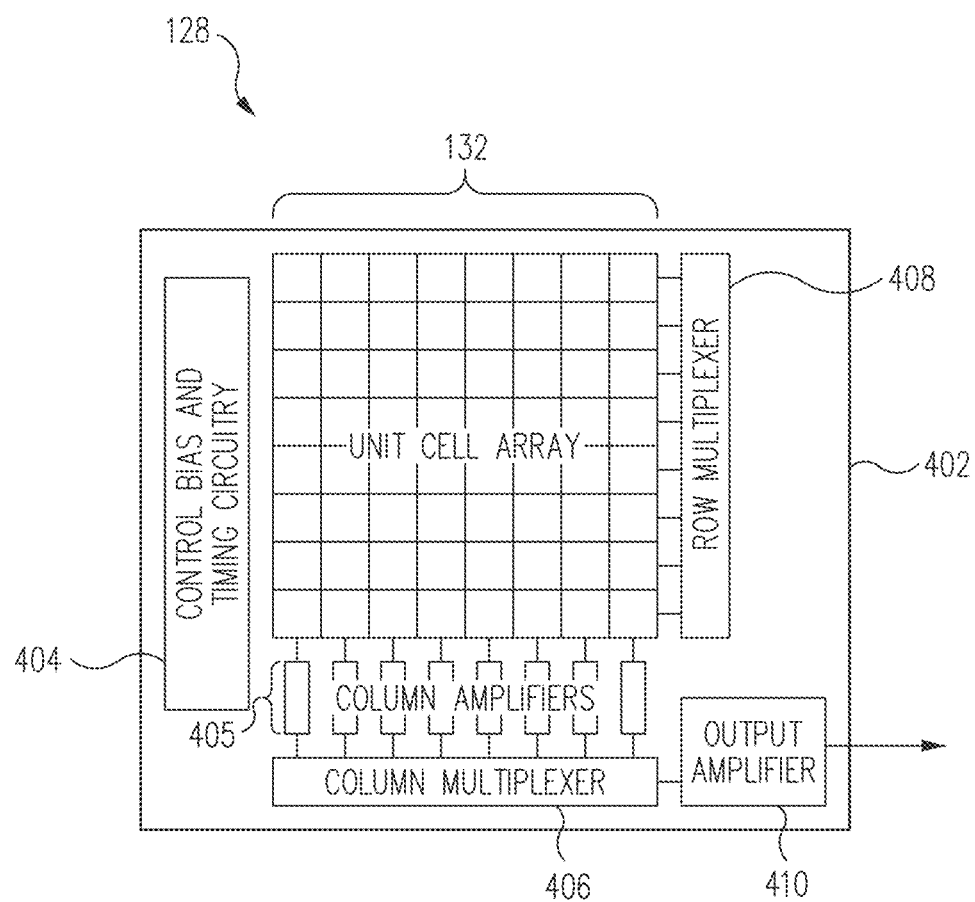
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROIC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

As discussed, in some embodiments, host device 102 may include other components 198 such as a non-thermal camera (e.g., visible light camera). The non-thermal camera may be a small form factor imaging module or imaging device, and may be implemented in a similar manner as various embodiments of infrared imaging module 100 disclosed herein, but with one or more sensors responsive to radiation in the non-thermal spectrum (e.g., radiation in visible light wavelengths, ultraviolet wavelengths, or other non-thermal wavelengths). For example, in some embodiments, the non-thermal camera may be implemented with a charge-coupled device (CCD) sensor, an electron multiplying CCD (EM-CCD) sensor, a complementary metal-oxide-semiconductor (CMOS) sensor, a scientific CMOS (sCMOS) sensor, or other sensors.

In some embodiments, the non-thermal camera may be co-located with infrared imaging module 100 and oriented such that a field-of-view (FOV) of the non-thermal camera at least partially overlaps a FOV of infrared imaging module 100. In one example, infrared imaging module 100 and the non-thermal camera may be implemented as a dual sensor module sharing a common substrate according to various techniques described in U.S. Provisional Patent Application No. 61/748,018 incorporated by reference herein.

For embodiments of host device 102 having such a non-thermal light camera, various components (e.g., processor 195, processing module 160, and/or other processing component) may be configured to superimpose, fuse, blend, or otherwise combine infrared images (e.g., including thermal images) captured by infrared imaging module 100 and non-thermal images (e.g., including visible light images) captured by the non-thermal camera, in accordance with various techniques disclosed in, for example, U.S. Patent Application No. 61/473,207, Ser. Nos. 12/766,739, 13/105,765, or 13/437,645, or International Patent Application No. PCT/EP2011/056432, all incorporated by reference herein.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
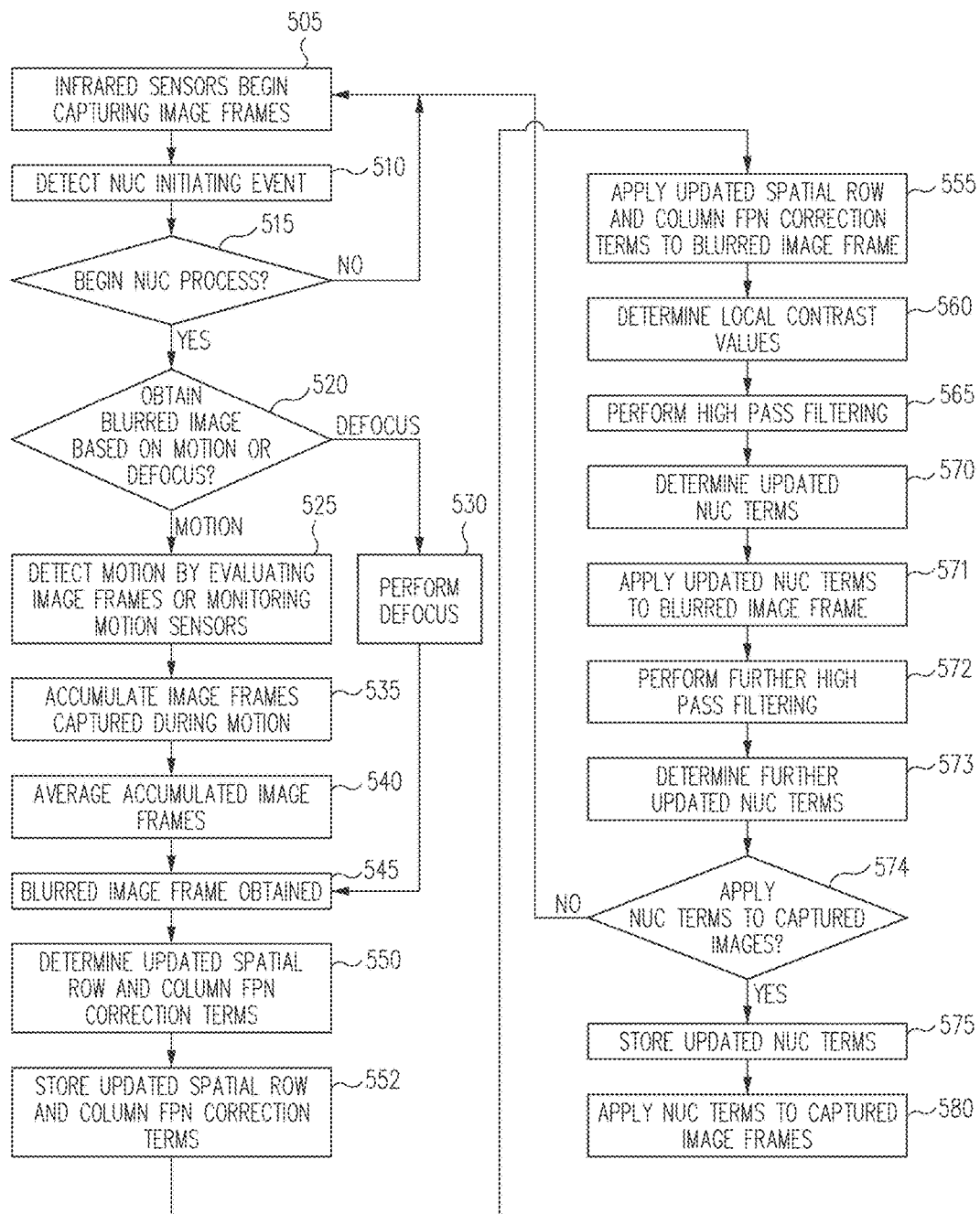
FIG. 5 illustrates a flow diagram of various operations to determine non-uniformity correction (NUC) terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is detected (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
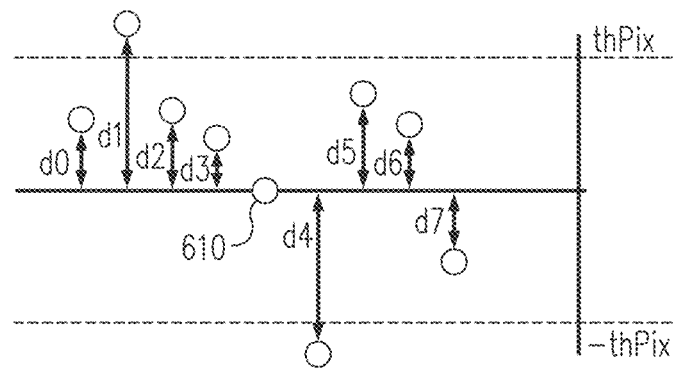
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
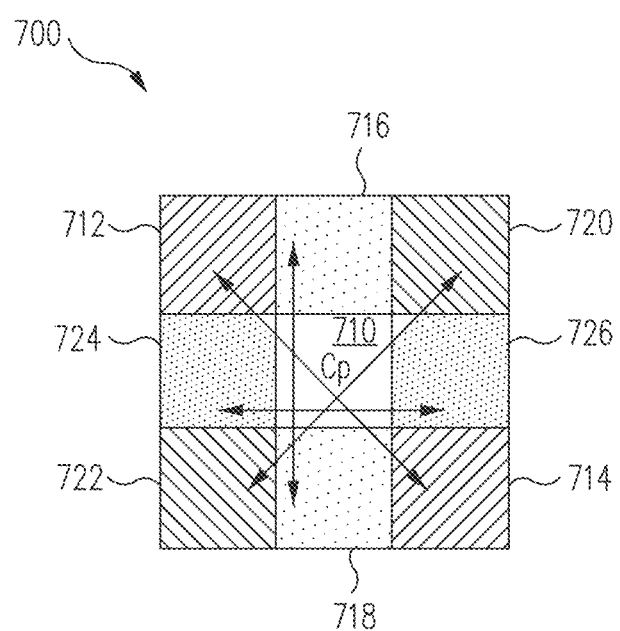
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor λ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW} = \lambda \cdot NUC_{OLD} + (1-\lambda) \cdot (NUC_{OLD} + NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN twins determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
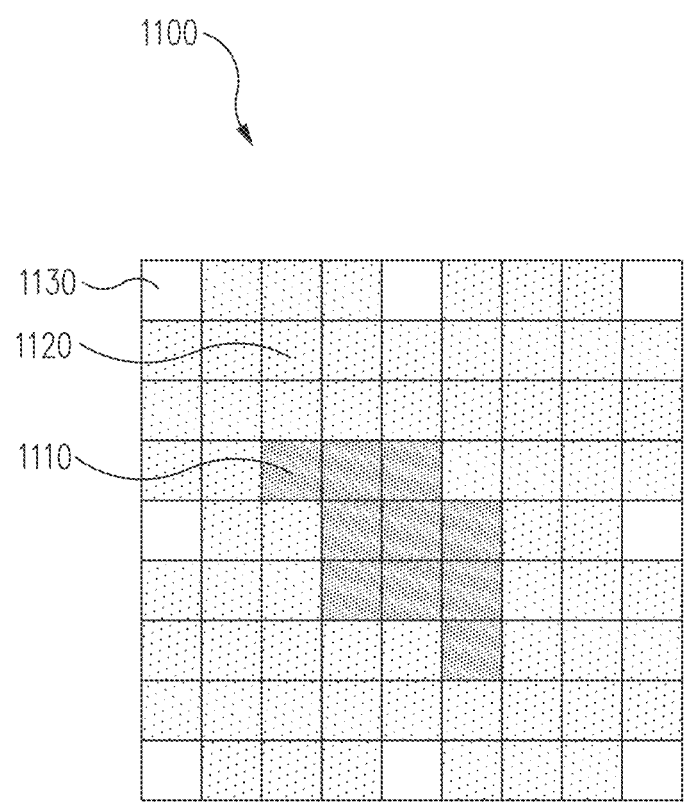
FIG. 11 illustrates spatially correlated fixed pattern noise (FPN) in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor λ may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
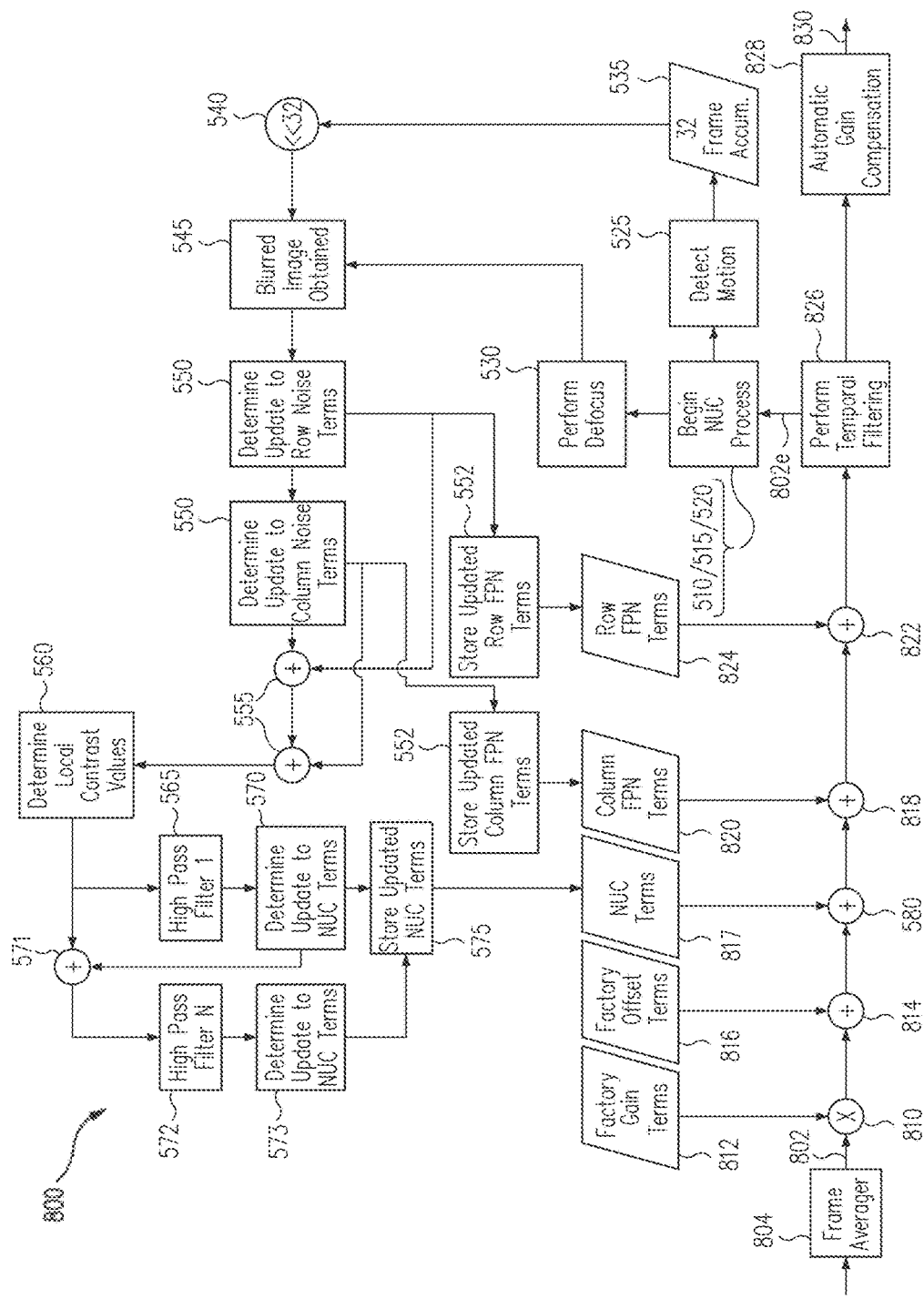
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 previously referenced herein.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
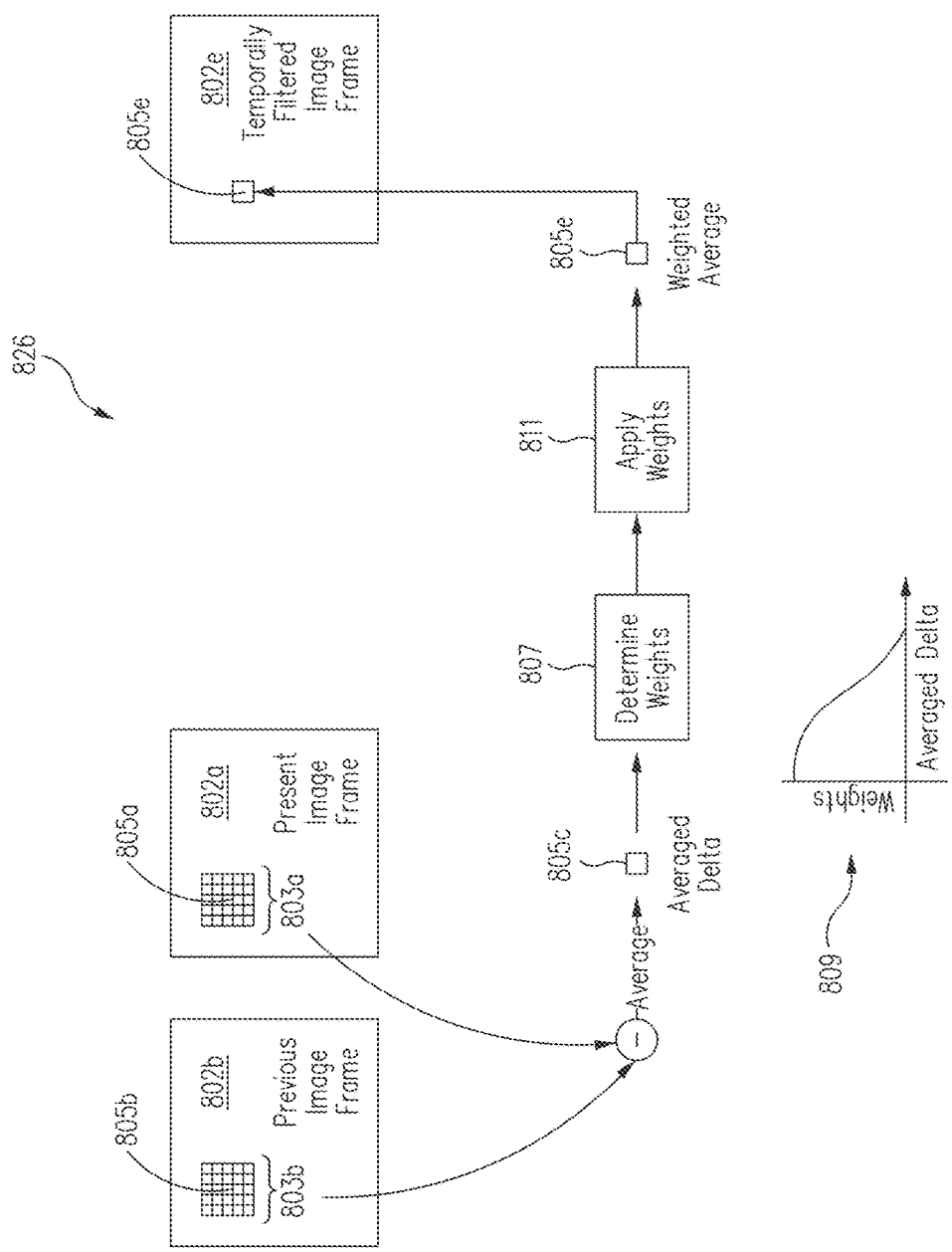
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802*a* and 802*b*. If the average difference between pixels 805*a* and 805*b* is due to noise, then it may be expected that the average change between neighborhoods 805*a* and 805*b* will be close to zero (e.g., corresponding to the average of uncorrelated changes). Under such circumstances, it may be expected that the sum of the differences between neighborhoods 805*a* and 805*b* will be close to zero. In this case, pixel 805*a* of image frame 802*a* may both be appropriately weighted so as to contribute to the value of pixel 805*e*.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805*a* and 805*b*. Under these circumstances, pixel 805*a* of image frame 802*a* may be weighted heavily, while pixel 805*b* of image frame 802*b* may be weighted lightly.

Other embodiments are also contemplated. For example, although averaged delta value 805*c* has been described as being determined based on neighborhoods 805*a* and 805*b*, in other embodiments averaged delta value 805*c* may be determined based on any desired criteria (e.g., based on individual pixels or other types of groups of sets of pixels).

In the above embodiments, image frame 802*a* has been described as a presently received image frame and image frame 802*b* has been described as a previously temporally filtered image frame. In another embodiment, image frames 802*a* and 802*b* may be first and second image frames captured by infrared imaging module 100 that have not been temporally filtered.

Figure 10:
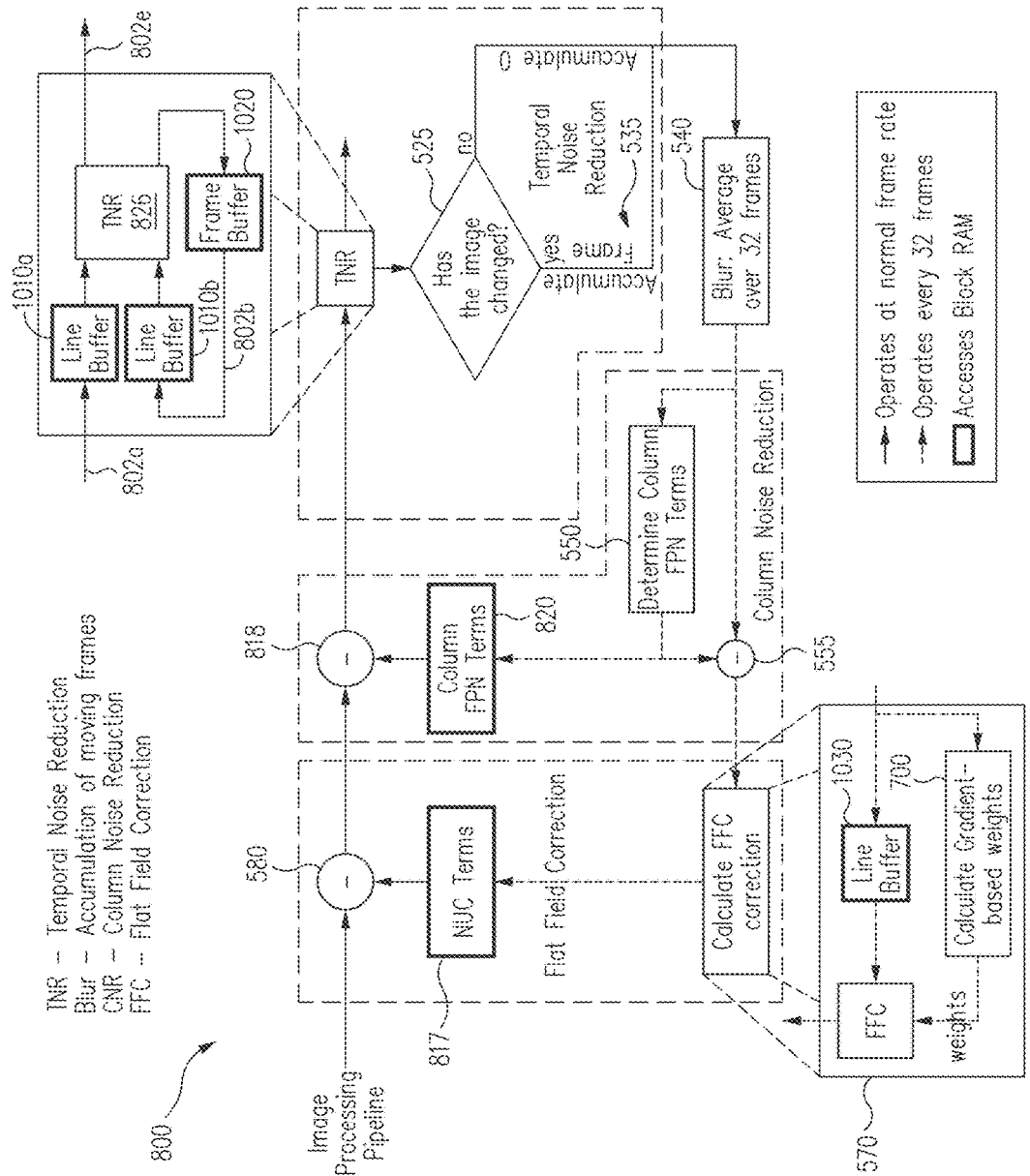
FIG. 10 illustrates particular implementation details of several processes of the image processing pipeline of FIG. 8 in accordance with an embodiment of the disclosure.

FIG. 10 illustrates further implementation details in relation to the TNR process of block 826. As shown in FIG. 10, image frames 802*a* and 802*b* may be read into line buffers 1010*a* and 1010*b*, respectively, and image frame 802*b* (e.g., the previous image frame) may be stored in a frame buffer 1020 before being read into line buffer 1010*b*. In one embodiment, line buffers 1010*a-b* and frame buffer 1020 may be implemented by a block of random access memory (RAM) provided by any appropriate component of infrared imaging module 100 and/or host device 102.

Referring again to FIG. 8, image frame 802*e* may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802*e* as shown in FIG. 8. Because image frames 802*e* have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is $1/32$ of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged.

This can improve the accuracy and effectiveness of noise correction terms determined in accordance with the various described techniques.

Referring again to infrared sensor assembly 128, techniques are further disclosed for using a hybrid infrared sensor array to implement infrared sensor assembly 128 or to implement generally other types of infrared sensor assemblies or FPAs. Such a hybrid infrared sensor array may include two or more heterogeneous types of infrared sensors provided in an array or other configuration of infrared sensors, in accordance with various embodiments of the disclosure. For example, in various embodiments, infrared sensors 132 of infrared sensor assembly 128 may be implemented as a FPA of microbolometers, where the FPA may include one or more infrared sensors that are not microbolometers. In various embodiments, such non-bolometric sensors may be provided (e.g., fabricated) in place of one or more microbolometers on a FPA, and may be utilized to obtain more accurate temperature information associated with a scene captured by the FPA. In some embodiments, such non-bolometric sensors may be provided (e.g., coupled to or adjacent to the FPA, such as a discrete non-bolometric sensor(s) physically attached to the FPA) in place of one or more microbolometers on a FPA or along with the microbolometers on the FPA, and may be utilized to obtain more accurate temperature information associated with a scene captured by the FPA.

Figure 12:
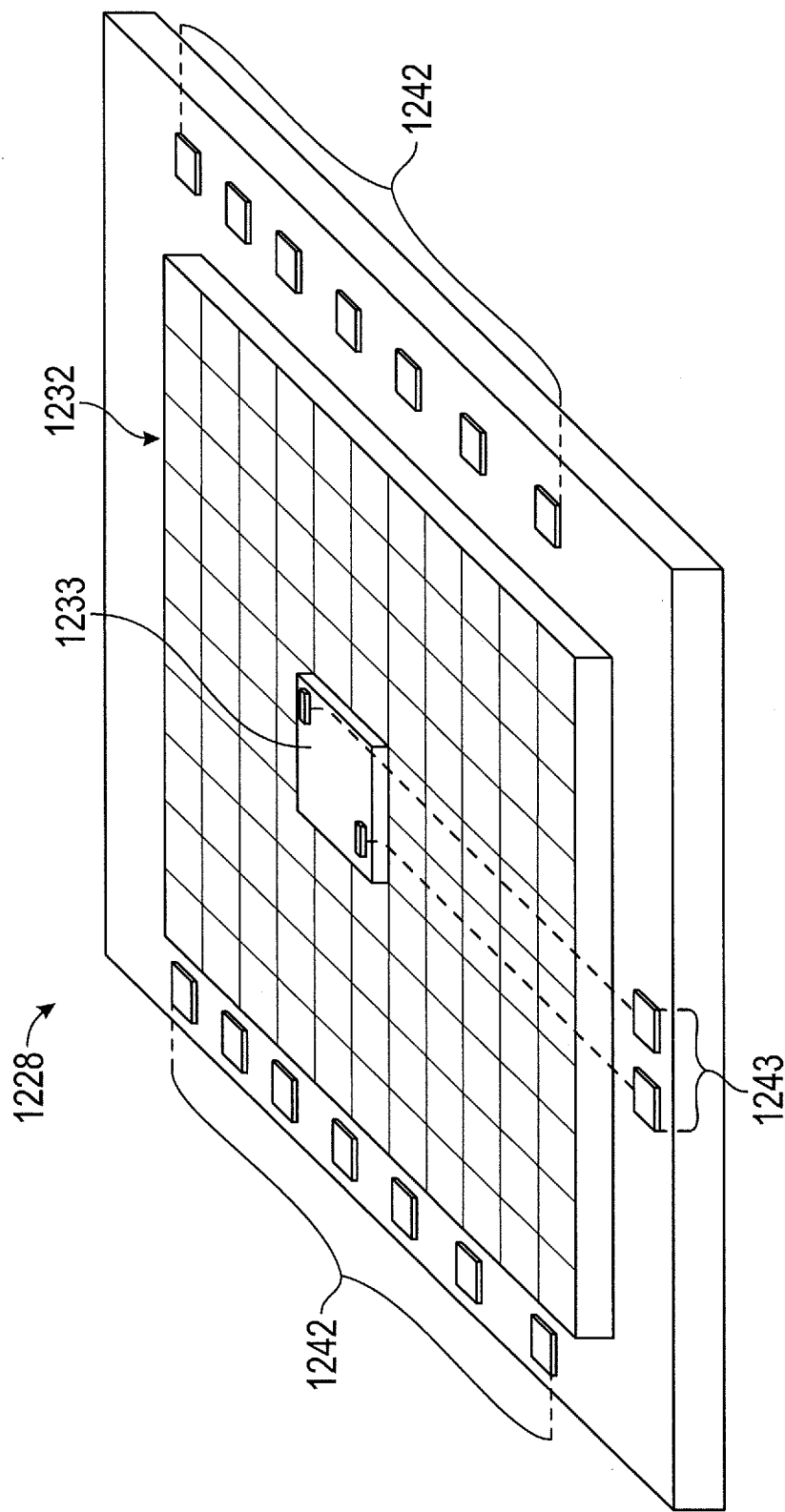
FIG. 12 illustrates a perspective view of another implementation of an infrared sensor assembly including a hybrid sensor array in accordance with an embodiment of the disclosure.

As an example implementation, FIG. 12 illustrates an infrared sensor assembly 1228 having a hybrid sensor array 1232, in accordance with an embodiment of the disclosure. In the illustrated embodiment shown in FIG. 12, a non-bolometric sensor 1233 may be provided in a generally central area of hybrid sensor array 1232, while the rest of hybrid infrared sensor array 1232 may be of microbolometers implemented in a similar manner as a corresponding implementation of infrared sensors 132 described above with regard to FIGS. 3 and 4. Although FIG. 12 shows a 10 by 11 array of microbolometers with non-bolometric sensor 1233 provided in place of four (2 by 2) microbolometers in a generally central area, it should be noted that any desired configuration may be used in various embodiments. For example, according to various embodiments, hybrid sensor array 1232 may be an array of approximately 32 by 32, approximately 64 by 64, approximately 80 by 60, or other array sizes, where non-bolometric sensor 1233 may be provided in place of any number of microbolometers depending on the relative sizes and other requirements of the microbolometers and non-bolometric sensor 1233.

As discussed herein, infrared sensor assembly 1228 may be configured to operate at lower voltages, for example, 2.8 volts, 2.5 volts, 2.4 volts, or lower voltages. In this regard, for some embodiments, a LDO may be provided as part of infrared sensor assembly 1228 having a hybrid sensor array 1232 (e.g., on the same chip and/or wafer level package as the ROIC). The LDO may be implemented as part of infrared sensor assembly 1228 and configured to supply a low, regulated voltage in a range of approximately 1.5 volts to 2.8 (e.g., approximately 2.5 volts in one embodiment) to various components of infrared sensor assembly 1228, in accordance with various techniques described in, for example, International Patent Application No. PCT/US2012/041744 entitled "LOW POWER AND SMALL FORM FACTOR INFRARED IMAGING" and incorporated herein by reference.

In some embodiments, non-bolometric sensor 1233 may be implemented as a thermopile. In general, a thermopile may include a thermocouple or a group of thermocouples, where each thermocouple may include a pair of dissimilar materials joined at two points (e.g., a hot junction and a cold junction) so that an output voltage may be generated by the thermoelectric effect when the hot junction receives infrared radiation. In many cases, such a thermopile may be used to determine (e.g., radiometrically) a temperature of an object (e.g., an object in a scene captured by hybrid sensor array 1232) more accurately than what can be obtained using typical microbolometers. Further, compared with a typical microbolometer, a thermopile may be less sensitive to changes in an ambient temperature.

For example, when determining a typical skin temperature of a person, a thermopile non-bolometric sensor 1233 of hybrid sensor array 1232 may have an error range of approximately ±0.1° F., whereas the microbolometers of hybrid sensor array 1232 may have an error range of approximately ±2° F., according to some implementations. Moreover, for example, a re-calibration procedure (e.g., a radiometric calibration procedure to produce an absolute temperature reading) for microbolometers and corresponding circuits may be more complex and more frequently required due to the sensitivity of microbolometers to varying ambient temperatures.

As described above, for embodiments in which a thermopile is used to implement non-bolometric sensor 1233, a pair of two dissimilar thermoelectric materials may be fabricated (e.g., deposited, grown, micro-machined, or otherwise formed) to make contact with each other at appropriate points. In various embodiments, a pair of various silicon-based and/or metal thermoelectric materials suitable for forming a thermocouple may be chosen to implement non-bolometric sensor 1233, as would be understood by one skilled in the art.

In some embodiments, one of the pair of materials may be a material employed in other parts (e.g., microbolometers of hybrid sensor array 1232) of infrared sensor assembly 1228, which in some cases may eliminate a need for an extra layer (e.g., an extra metal layer) during the fabrication process. For example, in one embodiment, one of the pair of materials for non-bolometric sensor 1233 may be VOx, with microbolometers of hybrid sensor array 1232 also being implemented as VOx detectors. The other of the pair of materials may be any suitable material for forming a thermocouple with a VOx layer. In one embodiment, non-bolometric sensor 1233 may be a thermopile of a VOx layer and a tungsten layer forming a pair. In another embodiment, at least one material of the pair may be a silicon-based material compatible with a silicon process for fabricating hybrid sensor array 1232 and/or infrared sensor assembly 1228.

Various types and combinations of materials may be used to implement thermocouples. Several non-limiting examples are identified in Table 1 below. In other examples, various semiconductor materials may be used to provide performance advantages (e.g., improvements in signal strength).

TABLE 1

| Type | Positive Side | Negative Side | Temperature Range of Operation |
| --- | --- | --- | --- |
| J | Iron | Copper, 45% Nickel | 0 to 760° C. |
| K | Nickel, 10% Chromium | Nickel, 2% Aluminum, 2% Manganese | 0 to 1260° C. |
| N | Nickel, 14% Chromium, | Nickel, 4.5% Silicon, | 0 to 1260° C. |

TABLE 1-continued

| Type | Positive Side | Negative Side | Temperature Range of Operation |
|---|---|---|---|
| T | 1.5% Silicon Copper | 0.1% Manganese Copper, 5% Nickel | −200 to 370° C. |
| E | Nickel, 10% Chromium | Copper, 45% Nickel | 0 to 870° C. |
| R | Platinum, 13% Rhodium | Platinum | 538 to 1482° C. |
| S | Platinum, 10% Rhodium | Platinum | 538 to 1482° C. |
| B | Platinum, 30% Rhodium | Platinum | 871 to 1704° C. |
| B | Platinum, 30% Rhodium | Platinum, 6% Rhodium | 871 to 1704° C. |

As discussed above, in the illustrated embodiment of FIG. 12 and other embodiments, a thermopile implementing non-bolometric sensor 1233 may have a larger two-dimensional size than a microbolometer, taking the place of four (2-by-2) microbolometers on hybrid sensor array 1232. In general, the dimension of the thermopile implementing non-bolometric sensor 1233 may vary as desired for particular application requirements. For example, the dimension of the thermopile may be increased (e.g., to include more and/or larger thermocouples) to achieve a desired signal-to-noise ratio or sensitivity. Thus, depending on the relative dimensions of the microbolometers and a desired implementation of the thermopile, the thermopile may take the place of a single microbolometer, four microbolometers, nine (3-by-3) microbolometers, or other appropriate number of microbolometers. It may be appreciated that for some embodiments, the microbolometers and/or the thermopile may not have a square pixel form, and as such, the thermopile implementing non-bolometric sensor 1233 may take the place of a non-square number of microbolometers.

Non-bolometric sensor 1233, in other embodiments, may be implemented using other types of non-bolometric sensors. For example, in some embodiments, non-bolometric sensor 1233 may be implemented using a pyroelectric detector (e.g., made of gallium nitride (GaN), caesium nitrate (CsNO3), polyvinyl fluorides, or other pyroelectric material that generates energy when exposed to heat). In another example, non-bolometric sensor 1233 may be implemented using a photonic detector sensitive to infrared radiation (e.g., various types of photodiodes including p-on-n, n-on-p, and other types). In yet another example, non-bolometric sensor 1233 may be implemented using a thermistor but without typical bolometric structures (e.g., without an absorber, bridges, and/or other structures included in a bolometer).

Substrate 1240 may include supporting circuits and/or electrical components (e.g., including semiconductor components) configured to obtain an output (e.g., an output voltage, current, resistance, or other value) from non-bolometric sensor 1233. For example, in some embodiments, substrate 1240 may include a pre-amplifier, a substrate temperature sensor (e.g., a reference thermistor or bolometer), a driver, a latch, a multiplexer, and/or other electrical components suitable for obtaining (e.g., generating desired signals based on) an output from the thermocouple described above, as would be understood by one skilled in the art. In some embodiments, substrate 1240 may also include bond pads 1243 that may be used to electrically connect the various circuits and/or components on substrate 1240 and associated with non-bolometric sensor 1233 to an external circuit or device. For example, housing 120 and/or circuit board 170, described above with respect to FIGS. 3 and 4, may further include suitable complementary contacts or connectors adapted to make electrical connections with bond pads 1243.

In some embodiments, substrate 1240 may otherwise be implemented in a same or similar manner as substrate 140 described above with respect to FIGS. 3-4 and elsewhere herein. That is, substrate 1240 may include a ROIC and/or other circuit for the microbolometers as described above for substrate 140, and may have bond pads 1242 implemented in a similar manner as bond pads 142. In other embodiments, the ROIC on substrate 1240 may be adapted to obtain and transmit (e.g., through bond pads 1242 or bond pads 1243) an output of non-bolometric sensor 1233 in addition to outputs of the microbolometers. In one embodiment, substrate 1240 may be adapted to transmit outputs of both non-bolometric sensor 1233 and the microbolometers through bond pads 1242 without separate bond pads (e.g., bond pads 1243) for non-bolometric sensor 1233.

Utilizing the microbolometers and non-bolometric sensor 1233 of hybrid sensor array 1232, infrared sensor assembly 1228 may capture images (e.g., thermal image data) and/or temperature information of a scene, and provide such images and/or temperature information from its ROIC and/or other circuits at various rates. As described above with respect to FIGS. 3 and 4, the captured images and/or temperature information may be provided to processing module 160 for appropriate processing. In an example application of infrared sensor assembly 1228, the captured and/or processed images may be provided to a host device (e.g., host device 102 of FIG. 1) to be stored, displayed, and/or further processed by the host device for viewing by a user of the host device. In another example application, the temperature information obtained using non-bolometric sensor 1233 may be received, stored, displayed, and/or further processed by the host device so that the user may obtain an accurate temperature reading of an object in a scene using the host device.

Because non-bolometric sensor 1233 may take the place of one or more microbolometers on hybrid sensor array 1232, raw image data captured by the microbolometers may contain a blind spot corresponding to the area on hybrid sensor array 1232 where incident infrared radiation from a scene is focused on non-bolometric sensor 1233. Thus, in some embodiments, the images captured by the microbolometers may be corrected, blended, or otherwise processed to generate images that have the blind spot filled in or otherwise removed. For example, in some embodiments, processing module 160 and/or processor 195 of host device 102 may be configured to blend the output (e.g., the temperature information) from non-bolometric sensor 1233 with the raw image data captured by the microbolometers to fill in the blind spot. In one embodiment, such a blending procedure may include converting and/or normalizing the output from non-bolometric sensor 1233 to generate pixel data that is compatible (e.g., in scale, format, and/or other qualities) with the image data captured by the microbolometers, and combining the converted and/or normalized pixel data with the image data to fill in the blind spot. In other embodiments, processing module 160 and/or processor 195 may be configured to extrapolate (e.g., by taking the average of neighboring pixels and/or other conventional methods) the raw image data to fill in the blind spot without using the output from non-bolometric sensor 1233. In yet other embodiments, the filling-in of the blind spot may be performed at the circuit level using the ROIC and/or other circuits on substrate 1240.

Figure 13:
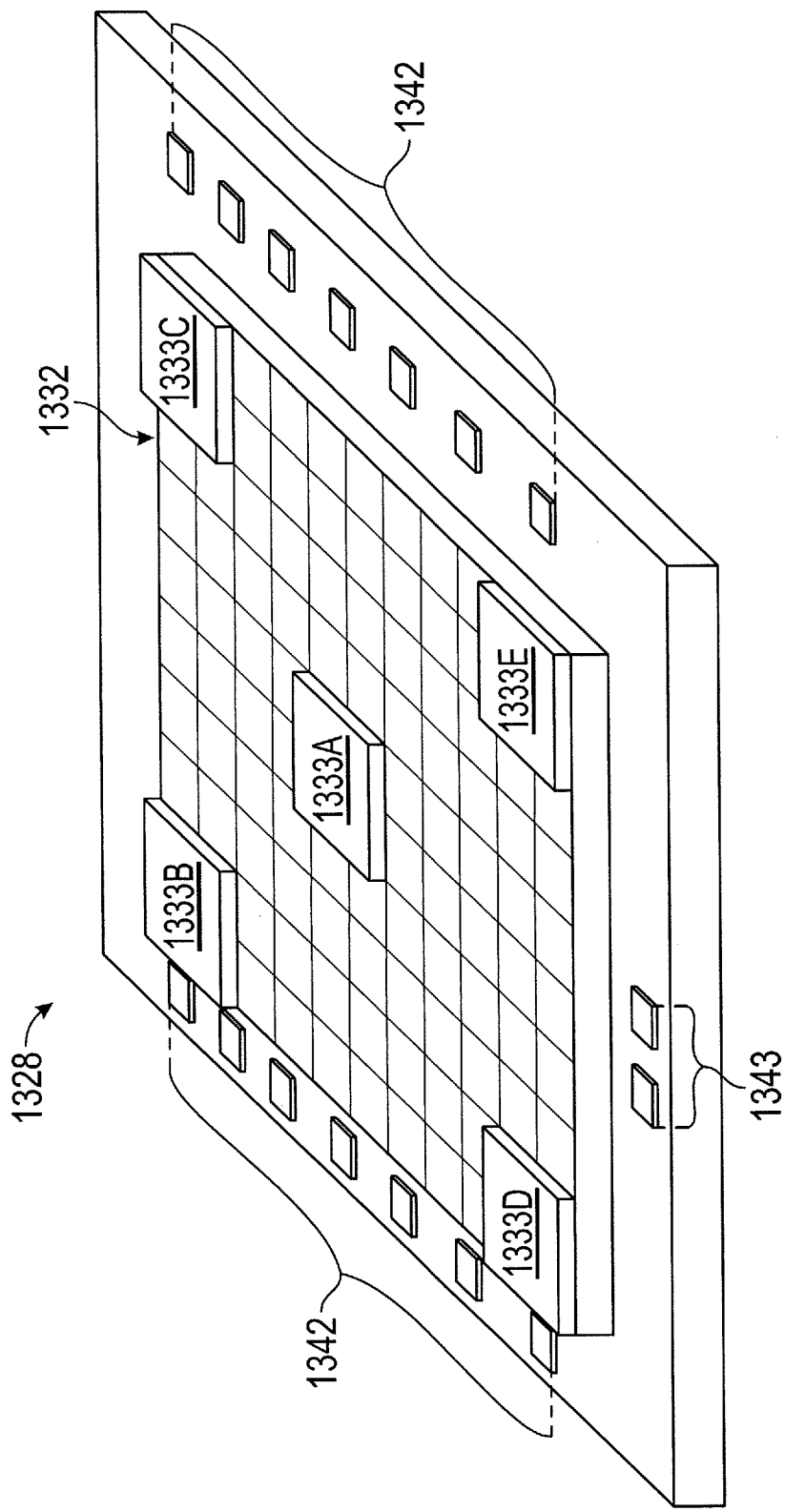
FIG. 13 illustrates a perspective view of yet another implementation of an infrared sensor assembly including a hybrid sensor array in accordance with an embodiment of the disclosure.

FIG. 13 shows an infrared sensor assembly 1328 having a hybrid sensor array 1332 according to another embodiment of the disclosure. As shown, hybrid sensor array 1332 may include a plurality of non-bolometric sensors 1333A-1333E provided in each corner and in a generally central area of hybrid infrared sensor array 1332. Each of non-bolometric sensors 1333A-1333E may be implemented in a same or similar manner as non-bolometric sensor 1233. Infrared sensor assembly 1328 may also include a substrate 1340, bond pads 1342 for a ROIC of microbolometers, bond pads 1343 for non-bolometric sensors 1333A-1333E, and/or other components, all of which may be implemented in a similar manner as the corresponding components of infrared sensor assembly 1228 of FIG. 12 but may be modified accordingly to accommodate the plurality of non-bolometric sensors 1333A-1333E instead of a single non-bolometric sensor 1233. For example, in some embodiments, substrate 1340 may include a multiplexer, a switching circuit, and/or other suitable components to multiplex or otherwise manage a plurality of outputs from non-bolometric sensors 1333A-1333E for transmission via bond pads 1343. In another example, the number of bond pads 1343 may be increased to support the plurality of non-bolometric sensors 1333A-1333E, for some embodiments. In another example, processing module 160, processor 195, and/or the various circuits of substrate 1340 may be configured to fill in a plurality of blind spots created by the plurality of non-bolometric sensors 1333A-1333E.

By providing non-bolometric sensors 1333A-1333E in each corner and in a generally central area of hybrid sensor array 1332, it may be possible to obtain a more accurate temperature reading associated with the overall scene captured by infrared sensor assembly 1328. For example, a plurality of temperature readings from the plurality of non-bolometric sensors 1333A-1333E may be averaged, interpolated, or otherwise processed to provide an average temperature of the scene, a temperature gradient, or other temperature information associated with the whole scene, rather than providing a spot reading of just a single object or area of the scene using a single non-bolometric sensor 1233 in the middle. In another example, the plurality of non-bolometric sensors 1333A-1333E may permit simultaneous multiple spot readings of multiple objects or areas in a scene. In another example, the plurality of non-bolometric sensors 1333A-1333E at various locations on hybrid sensor array 1332 may permit a spot reading of an object or area in a scene without having to move a host device (e.g., host device 102) to place the object or area in the center of the scene.

Other numbers and/or locations of non-bolometric sensors 1233/1333A-1333E are contemplated for other embodiments within the scope and spirit of the disclosure. For example, in one embodiment, four non-bolometric sensors may be provided, with each of the non-bolometric sensors disposed in each corner of a hybrid sensor array. Further, although infrared sensor assembly 1228/1328 may have been described above with respect to infrared sensor assembly 128 of infrared imaging module 100, the techniques described for infrared sensor assembly 1228/1328 may be applied to other imaging sensor assemblies, packages, or modules without departing from the scope and spirit of the disclosure. For example, non-bolometric infrared sensors may be provided on visible-light imaging sensor assemblies (e.g., CCD-based or CMOS-based imaging sensors), other infrared imaging sensor assemblies, or imaging sensor assemblies adapted to capture electromagnetic radiation in other wavelengths, according to the techniques described herein appropriately modified for the sensor assembly type.

Therefore, for example, various implementations of infrared sensor assembly 1228/1328 having hybrid sensor array 1232/1332 may be packaged as infrared imaging module 100 implemented in host device 102 to provide not only thermal imaging capabilities (e.g., including allowing users to view, store, or further process thermal images captured using host device 102), but also capabilities to obtain more accurate and stable temperature readings of objects/areas in a scene or the scene itself. By way of example, using such a host device, a user may be able to obtain an accurate (e.g., accurate to approximately ±0.1° F.) spot reading of a person's body temperature while viewing a thermal image of the person that shows an overall temperature distribution. To aid the user in obtaining spot temperature readings, such a host device may be configured, for example, to indicate (e.g., using an indicator such as a crosshair/reticle displayed on a screen or a laser indicator projected onto objects) a spot or spots of the scene where spot temperature readings may be obtained.

Furthermore, in various embodiments, non-bolometric sensors 1233/1333A-1333E may be utilized to perform a radiometric calibration of the microbolometers of hybrid sensor array 1232/1332. As noted above, in some cases the microbolometers and related circuits/components may need a periodic radiometric calibration in order to maintain a correlation between the outputs of the microbolometers and the measured temperature or flux. In general, a radiometric calibration procedure for bolometers may involve causing an array of bolometers (e.g., an FPA of microbolometers) to view a uniform flux scene (e.g., all bolometers of a sensor array receiving a substantially similar amount of infrared radiation flux) at varying temperature levels. Some conventional methods may involve an external black body device that may be controlled to produce desired amounts of uniform infrared radiation flux, as may be understood by one skilled in the art. Other conventional methods may permit a standalone radiometric calibration by utilizing a shutter (e.g., shutter 105 of FIG. 1) that may be closed and temperature-controlled to provide a uniform flux scene to the sensor array.

In contrast, for infrared sensor assembly 1228/1328 in various embodiments, a standalone radiometric calibration procedure may be performed without the need for a shutter or an external black body device. For example, non-bolometric sensors 1233/1333A-1333E may be utilized to provide a reference temperature or flux reading associated with a scene viewed by hybrid sensor array 1232/1332, where the microbolometers of hybrid sensor array 1232/1332 may be calibrated based on the reference temperature reading. That is, for example, instead of viewing a scene created by a temperature-controlled shutter or black body device, hybrid sensor array 1232/1332 may view any substantially uniform scene (e.g., a patch of a wall or any other surface having substantially uniform temperature and emissivity that a user may direct host device 102 having infrared assembly 1228/1328 to view) while a radiometric calibration procedure is performed, given that the reference temperature or flux for such a scene may be obtained using non-bolometric sensors 1233/1333A-1333E. In this regard, according to some embodiments, infrared sensor assembly 1228/1328, processing module 160, processor 195, and/or other components of infrared imaging module 100 and host device 102 may be configured to perform a standalone but shutter-less radiometric calibration procedure using non-bolometric sensors 1233/1333A-1333E.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An infrared sensor assembly comprising:
   an array of infrared sensors, the array comprising:
      a plurality of microbolometers configured to image a scene, and
      at least one non-bolometric sensor configured to detect infrared radiation from at least a portion of the scene; and
   a substrate coupled to the array, the substrate comprising:
      a readout integrated circuit (ROIC) configured to provide first signals from the microbolometers corresponding to a captured infrared image of the scene,
      an output circuit configured to provide second signals from the at least one non-bolometric sensor corresponding to the infrared radiation, and
      a processor configured to radiometrically calibrate the microbolometers based on the second signals provided by the output circuit.

2. The infrared sensor assembly of claim 1, wherein the processor is further configured to radiometrically calibrate the microbolometers further based on the first signals provided by the ROIC.

3. The infrared sensor assembly of claim 1, wherein the captured infrared image contains at least one blind spot corresponding to the location of the at least one non-bolometric sensor among the array, and wherein the processor is configured to generate a blended infrared image that has the at least one blind spot filled based at least on the captured infrared image.

4. The infrared sensor assembly of claim 3, wherein the processor is configured to generate the blended infrared image by converting the second signals from the at least one non-bolometric sensor into pixel data and combining the pixel data with the captured infrared image.

5. The infrared sensor assembly of claim 3, wherein the processor is configured to generate the blended infrared image by extrapolating pixel data for the at least one blind spot from an average of neighboring pixels to the at least one blind spot in the captured infrared image without using the second signals from the at least one non-bolometric sensor.

6. The infrared sensor assembly of claim 1, wherein the at least one non-bolometric sensor comprises one of a thermopile infrared sensor or a pyroelectric detector.

7. The infrared sensor assembly of claim 1, wherein the at least one non-bolometric sensor comprises a plurality of non-bolometric sensors, and wherein the plurality of non-bolometric sensors and configured to:
   determine an average temperature of the scene using the plurality of non-bolometric sensors; and
   obtain multiple spot temperature readings of the scene using the plurality of non-bolometric sensors without moving the infrared sensor assembly.

8. The infrared sensor assembly of claim 1, wherein the processor is configured to radiometrically calibrate the microbolometers without using a shutter or black body device for the infrared sensor assembly.

9. The infrared sensor assembly of claim 8, wherein the scene is of substantially uniform temperature during radiometrically calibrating the microbolometers by the processor.

10. The infrared sensor assembly of claim 1, wherein the at least one non-bolometric sensor is provided in place of one or more of the microbolometers.

11. A method comprising:
   receiving, at an array of infrared sensors, infrared radiation from a scene, wherein the array comprises a plurality of microbolometers and at least one non-bolometric sensor;
   providing, by a readout integrated circuit (ROIC) communicatively coupled to the plurality of microbolometers, infrared image data representing an infrared image of the scene;
   providing, by an output circuit communicatively coupled to the at least one non-bolometric sensor, temperature information associated with the scene, wherein the ROIC and the output circuit are provided on a substrate; and
   radiometrically calibrating the plurality of microbolometers based on the temperature information provided by the output circuit.

12. The method of claim 11, wherein the radiometrically calibrating the plurality of microbolometers is further based on the infrared image data provided by the ROIC.

13. The method of claim 11, wherein the infrared image contains at least one blind spot corresponding to a location of the at least one non-bolometric sensor on the array, and wherein the method further comprises:
   generating a blended infrared image data representing a blended infrared image that has the at least one blind spot filled based at least on the infrared image data.

14. The method of claim 13, wherein the generating the blended infrared image comprises:
   converting the temperature information from the at least one non-bolometric sensor into pixel data; and
   combining the pixel data with the infrared image data.

15. The method of claim 13, herein the generating the blended infrared image comprises:
   extrapolating pixel data for the at least one blind spot from an average of neighboring pixels to the at least one blind spot in the infrared image data without using the temperature information from the at least one non-bolometric sensor.

16. The method of claim 11, wherein the at least one non-bolometric sensor comprises a plurality of non-bolometric sensors, and wherein the method further comprises:
determining an average temperature of the scene using the plurality of non-bolometric sensors; and
obtaining multiple spot temperature readings of the scene using the plurality of non-bolometric sensors without moving the infrared sensor assembly.

17. The method of claim 11, radiometrically calibrate the microbolometers without using a shutter or black body device for the infrared sensor assembly
and wherein the scene is of substantially uniform temperature during radiometrically calibrating the microbolometers by the processor.

18. The method of claim 11, wherein the at least one non-bolometric sensor is provided in place of one or more of the plurality of microbolometers.

19. A method of providing a hybrid infrared sensor assembly, the method comprising:
fabricating microbolometers to form a focal plane array (FPA);
fabricating at least one non-bolometric sensor on the FPA;
providing a readout integrated circuit (ROIC) electrically coupled to the microbolometers to generate output signals corresponding to an image of infrared radiation incident on the microbolometers; and
providing bond pads electrically connected to the at least one non-bolometric sensor and configured to form an electrical connection with an external device to generate temperature information associated with the infrared radiation using the at least one non-bolometric sensor, wherein the external device radiometrically calibrates the microbolometers based on the temperature information.

20. The method of providing a hybrid infrared sensor assembly of claim 19, wherein the external device further radiometrically calibrates the microbolometers based on the output signals corresponding to the image of the infrared radiation provided by the ROIC.

* * * * *

UNITED STATES PATENT AND TRADEMARK OFFICE
CERTIFICATE OF CORRECTION

PATENT NO. : 10,110,833 B2
APPLICATION NO. : 15/645988
DATED : October 23, 2018
INVENTOR(S) : Andrew C. Teich et al.

Page 1 of 1

It is certified that error appears in the above-identified patent and that said Letters Patent is hereby corrected as shown below:

In the Specification

In Column 11, Line 10, change "Application No. 61/473,207, Ser. Nos. 12/766,739," to --Application Nos. 61/473,207, 12/766,739,--.

In Column 17, Line 45, change "twins" to --terms--.

Signed and Sealed this
First Day of January, 2019

Andrei Iancu
*Director of the United States Patent and Trademark Office*